Patented June 26, 1934

1,964,380

UNITED STATES PATENT OFFICE 1,964,380

ADHESIVE CEMENT

Louis G. Copes, Bayonne, N. J., assignor to Gold Dust Corporation, New York, N. Y., a corporation of New Jersey No Drawing. Application March 25, 1931
Serial No. 525,341

3 Claims. (Cl. 87—17)

This invention relates to the preparation of an adhesive cement and more particularly to the production of a compound suitable for cementing a material having a paraffined surface to a cardboard or other porous material.

When certain food products, such as mayonnaise, peanut butter, etc., are packed in jars having metal caps, it is desirable to protect the cap from contact with the food product by inserting a disc in the caps. This disc is preferably of a porous material, so that it may be compressed when the cap is screwed upon the jar and should be coated or covered in such a manner that the oil or other liquid in the food product will not be absorbed in it. To accomplish this I provide a porous disc of cardboard or other suitable material, a disc of oiled and/or paraffin coated paper and an adhesive cement between the two discs.

It is an object of this invention to provide a cement of improved characteristics for this purpose. It is also an object to provide a cement which may be used satisfactorily upon an article subjected to a considerable range of temperature changes. Another object is to provide a cement which will adhere to the cardboard disc and to the paraffined surface and which will not be absorbed excessively by the porous material. It is also an object to provide a cement that will not react with the contents of the jar and which will not give off odors or flavors that would be objectionable when used in connection with a food product. Other objects will become apparent.

I have found that a suitable cement may be prepared by mixing the following ingredients in the proportions stated:

| | Parts |
|---|---|
| Chicle gum | 20 |
| Dammar gum | 20 |
| Non-volatile liquid petroleum oil | 10 |

Although I prefer to use a chicle gum sold on the market as XX gum, which is a relatively soft and non-brittle chicle gum having a reddish color, other similar gums may be used and it need not be a highly refined gum. Other fusible gum resins, such as rosin, ester gum, etc., may be substituted for the dammar gum and although I prefer to use liquid petrolatum, which is a paraffin oil having a specific gravity of about 0.885 at 73° F., other non-volatile liquid petroleum oils may be used for this purpose.

A cement prepared in accordance with the above formula forms, at ordinary room temperatures, a very heavy viscous and nearly solid mass of great tenacity or stickiness. At low temperatures, outdoor winter temperature, for example, it becomes practically solid, but there is no tendency toward crystallization and when it is rewarmed to room temperature, its original consistency and adhesiveness are restored. At elevated temperatures, that is, at temperatures over atmospheric temperatures but below the temperature of boiling water, it is fusible to a liquid so that it may be readily applied to the surfaces to be united.

Since none of the materials used in preparing this cement are volatile or readily oxidizable, no alterations in the characteristics of the adhesive occur upon prolonged standing and exposure to the air. In other words, it is stable under ordinary conditions of exposure to temperature and air and remains unchanged even when allowed to stand for long periods of time. At ordinary temperatures this cement is odorless or so nearly so that it emanates no objectionable odors and does not impart foreign flavors or tastes to the contents of the jar.

This cement is both oil proof and water proof, which properties are of particular importance when a product such as mayonnaise is contained in the jar. The mayonnaise has no solvent action upon the cement and the latter does not have any apparent action upon the mayonnaise even when in actual contact with it. Another important and indispensable property possessed by this cement is the absence of any tendency for the cement to be absorbed by the porous liner under the paraffined disc, so that when it is used to cement the paraffined disc to the liner the cementing effect is permanent and the adhesive does not disappear by absorption into the porous disc. Such a cement will also adhere tenaciously to the paraffined oil-paper disc as well as to the porous cardboard disc. It would, of course, adhere with similar effectiveness to an oil paper disc which is not coated with paraffin but it is of special value in that it may be used with a paraffin coated article which is more difficult to fasten.

The particular proportions referred to above may be altered in order to change the characteristics of the cement and to give it the properties desired. It is intended that the terms used in describing and claiming the invention be considered as terms of description and not as limitations upon the scope of the invention and the equivalents of these terms are intended to be included within the scope of the appended claims.

What I claim is:

1. An adhesive cement consisting substantially of a chicle gum, a fusible gum resin and a non-volatile liquid petroleum oil.

2. An adhesive cement consisting substantially of 20 parts of chicle gum, 20 parts of dammar gum and 10 parts of non-volatile liquid petroleum oil.

3. An adhesive cement adapted to secure a paraffin disc to a porous liner for a bottle cap, comprising substantially equal parts of chicle gum and dammar gum, and a non-volatile liquid petroleum oil in the order of about one-fourth of the amount of chicle gum and dammar gum.

LOUIS G. COPES.